(12) United States Patent
Chapman, Jr. et al.

(10) Patent No.: US 6,642,310 B2
(45) Date of Patent: Nov. 4, 2003

(54) PROCESS AID FOR MELT PROCESSABLE POLYMERS

(75) Inventors: George Richard Chapman, Jr., Media, PA (US); Steven Richard Oriani, Landenberg, PA (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/953,638

(22) Filed: Sep. 17, 2001

(65) Prior Publication Data

US 2002/0161120 A1 Oct. 31, 2002

Related U.S. Application Data

(60) Provisional application No. 60/269,247, filed on Feb. 16, 2001.

(51) Int. Cl.$^7$ .......................... C08L 27/12; C08L 27/14; C08L 27/16; C08L 27/18; C08L 27/20
(52) U.S. Cl. ........................ 525/101; 525/165; 525/166; 525/179; 525/199; 525/200
(58) Field of Search ................................. 525/101, 165, 525/166, 179, 199, 200

(56) References Cited

U.S. PATENT DOCUMENTS

| | | |
|---|---|---|
| 3,125,547 A | 3/1964 | Blatz |
| 4,855,360 A | 8/1989 | Duchesne et al. |
| 4,904,735 A | 2/1990 | Chapman, Jr. et al. |
| 5,010,130 A | 4/1991 | Chapman, Jr. et al. |
| 5,015,693 A | 5/1991 | Duchesne et al. |
| 5,081,188 A | 1/1992 | Kim |
| 5,587,429 A | 12/1996 | Priester |
| 5,707,569 A | 1/1998 | Priester et al. |
| 5,830,947 A | 11/1998 | Blong et al. |
| 5,962,140 A | 10/1999 | Rajagopalan |
| 6,048,937 A | 4/2000 | Bauer et al. |
| 6,048,939 A | 4/2000 | Priester |
| 6,242,548 B1 * | 6/2001 | Duchesne et al. .......... 526/255 |

FOREIGN PATENT DOCUMENTS

| | | |
|---|---|---|
| CA | 2264463 | 9/2000 |
| GB | 1597179 | 9/1981 |
| WO | WO 9945065 | 9/1999 |
| WO | WO 0142363 A1 | 6/2001 |

OTHER PUBLICATIONS

Dynamar™ Polymer Processing Additives Direct Addition During Resin Manufacture, Dyneon 2000, Dec. 2000, 98–0504–1088–9.
Dynamar™ Polymer Processing Additive Optical Microscopy Method for Dispersion Analysis in Polyolefins, Dyneon 1997, pp. 1–4, 98–0504–0270–4.
R. J. Athey, R. C. Thamm, R. D. Souffie, and G. R. Chapman, Viton® Free Flow—The Processing Behavior of Polyolefins Containing a Fluoroelastomer Additive*, DuPont Dow Elastomers Technical Information, May, 1992, pp. 1–7, H–284351.
Viton® Free Flow—Masterbatch, DuPont Dow Elastomers Technical Information, May, 1992, H–28357–1.
G. R. Chapman, D. E. Priester, and R. D. Souffie, Viton® Free Flow—Advances in the Use of Fluoroelastomers as Process Aids for Polyolefins*, DuPont Dow Elastomers Technical Information, May 1992, pp. 1–5, H–28437–1.
Viton® Free Flow—Mechanism, DuPont Dow Elastomers Technical Information, May 1991, H–28355.
D. E. Priester, Dr. K. M. Stika, G. R. Chapman, R. S. Mc Minn and Dr. P. Ferrandez, Quality Control Techniques for Processing Additives, Antec /93, pp. 2528–2533.
R. J. Athey, R. C. Thamm, R. D. Souffie, and G. R. Chapman, The Processing Behavior of Polyolefins Containing a Fluoroelastomer Additive, Antec '86, pp. 1149–1153.
TONE® Polymers P–767 and P–787 High Molecular Weight Caprolactone Poplymers, 1999 Union Carbide, Jul. 1999, UC–2032, pp. 1–16.
Derwent Abstract—German Patent Application DE 19549389, published Jul. 17, 1997.
Derwent Abstract—Japanese Patent Application Kokai 7290550, published Nov. 7, 1995.

* cited by examiner

Primary Examiner—Ana Woodward

(57) ABSTRACT

Extrusion processability of non-fluorinated melt-processable polymers is improved by introducing a fluoropolymer process aid by means whereby the weight average particle size of the fluoropolymer is greater than 2 microns as it reaches the extruder die entrance.

29 Claims, No Drawings

PROCESS AID FOR MELT PROCESSABLE POLYMERS

CROSS-REFERENCE TO RELATED APPLICATIONS

This application claims the benefit of U.S. Provisional Application No. 60/269,247 filed Feb. 16, 2001.

FIELD OF THE INVENTION

The present invention relates to extrusion of non-fluorinated melt-processable polymers which contain fluoropolymer processing aids.

BACKGROUND OF THE INVENTION

The melt extrusion of high molecular weight polymers, for example, hydrocarbon polymers and polyamides, into shaped structures such as tubing, pipe, wire coating or film is accomplished by well-known procedures wherein a rotating screw pushes a viscous polymer melt through an extruder barrel into a die in which the polymer is shaped to the desired form and is then subsequently cooled and solidified into a product having the general shape of the die.

In order to achieve low production costs, it is desirable to extrude the polymer at rapid rates. Higher extrusion rates may be readily obtained by increasing the rate of revolution of the extruder screw. However, this technique is subject to limitations imposed by the viscoelastic properties of the polymer substrate. Thus, at very high extrusion rates an unacceptable amount of thermal decomposition of the polymer can result. Further, extrudates having a rough surface are often obtained which can lead to formation of an undesirable pattern on the surface of the extrudate. These surface defects are also known as melt fracture. Extrusion at elevated temperatures obviates this problem but adds to processing costs. Also, cooling of the extrudate becomes problematic. In addition, if polyolefins are extruded at temperatures near their decomposition points, polymer degradation occurs.

It is desirable, therefore, to find highly efficient means of increasing the extrusion rate without raising the melt temperature, while producing articles having smooth surfaces. Changes in extruder and die configuration can improve polymer melt flow, but these modifications are not always practical or economically feasible. Another approach involves the addition of conventional wax-type process aids which reduce bulk viscosity and in some cases improve processing properties. However, the efficiency is marginal and the high levels of additive required often adversely affect other properties.

In Blatz, U.S. Pat. No. 3,125,547, it is disclosed that the use of 0.01–2.0 wt. % of a fluorocarbon polymer that is in a fluid state at the processing temperature (e.g. a fluoroelastomer) will reduce die pressure in extrusions of both high and low density polyethylenes, as well as other polyolefins. Further, use of this additive allows significant increase in extrusion rates without melt fracture.

Kamiya and Inui, in Japanese Examined Patent Application Kokoku 45-30574, cite the use of crystalline fluorocarbon polymers at temperatures below their melting points to eliminate die build-up, but they disclose nothing regarding other extrusion improvements.

Nishida, et al., in Japanese Patent Application Publication Kokai 62-64847, disclose injection molding compositions comprising a mixture of a) an ethylene/alpha olefin copolymer having a melt flow rate (MFR) of 0.2–200 g/10 minutes and a density of 0.850–0.945 g/cm$^3$, with b) 0.001–1% by weight of a fluorinated hydrocarbon polymer having a fluorine to carbon ratio of at least 1:2.

Chu, in U.S. Pat. No. 4,740,341, discloses blends having improved extrudability comprising linear polymers of ethylene having incorporated therein small amounts of fluorocarbon polymers and polysiloxanes. The fluorocarbon polymers have fluorine to carbon ratios of at least 1:2 and are fluid at 120°–300° C.

Larsen, in U.S. Pat. No. 3,334,157, discloses polyethylene which has been modified to improve its optical properties by incorporation of 0.015 to greater than 1.7% by wt., based on the mixture, of finely divided polytetrafluoroethylene.

More recently, improved fluoropolymer process aid compositions have been disclosed in for example, U.S. Pat. Nos. 4,855,360; 5,587,429 and 5,707,569. In these fluoropolymer process aid compositions, a second additive, such as a poly(oxyalkylene) or an ionomer resin, is introduced in order to improve extrusion processability of the non-fluorinated polymer.

In order to maximize processability improvements, the prior art has stated that it is desirable that the fluoropolymer process aid compositions be well dispersed in the non-fluorinated polymer which is to be extruded and that the smaller the particle size of the fluoropolymer, the better the dispersion and thus the better the processability. See, for example, "Dynamar™ Polymer Processing Additive Optical Microscopy Method for Dispersion Analysis in Polyolefins " (Dyneon 1997), which recommends uniform dispersions and fluoropolymer process aid particle sizes 2 microns or less in the extrudate; "Dynamar™ Polymer Processing Additives Direct Addition During Resin Manufacture " (Dyneon 12/2000), which recommends uniform dispersions and fluoropolymer process aid particle sizes of 3 microns or less in the extrudable composition. Similar recommendations have been made in U.S. Pat. Nos. 3,125,547; 5,010, 130; and 6,048,939.

Due to these references which teach that extrusion processability is improved by improving the degree of the dispersion of the fluoropolymer process aid in the melt processable polymer, and by decreasing the particle size of the fluoropolymer, much of the prior work in this field has focused on improving the quality of the dispersion and minimizing the fluoropolymer particle size. Still, there is room for improvement in extrusion processability.

SUMMARY OF THE INVENTION

It has been surprising discovered that extrudable compositions which contain predominantly large particle size fluoropolymer actually process better, exhibiting fewer melt defects and have faster conditioning times, than those compositions which follow the recommendations of the prior art and strive for maximum fluoropolymer dispersion. By "predominantly large particle size fluoropolymer" is meant a weight average particle size (as hereinafter defined) of greater than 2 microns, but less than 10 microns, as measured at a point immediately preceding the die. Extrudable compositions which contain predominantly large particle size fluoropolymer can be achieved by a number of means.

Accordingly, one aspect of the present invention is an extrudable composition for passing through a die, said composition comprising:

A) a non-fluorinated melt processable polymer; and

B) 25 to 2000 parts per million by weight, based on total weight of the extrudable composition, of fluoropolymer, said fluoropolymer having a weight average particle size greater than 2 microns and less than 10 microns, as measured at a point immediately preceding the die; and wherein said composition is substantially free of interfacial agent.

Another aspect of the present invention is an extrudable composition for passing through a die, said composition comprising:

A) a non-fluorinated melt processable polymer;

B) 25 to 2000 parts per million by weight, based on total weight of the extrudable composition, of a fluoropolymer, said fluoropolymer having a weight average particle size greater than 2 microns and less than 10 microns, as measured at a point immediately preceding the die; and C) at least an effective amount of interfacial agent to achieve a fluoropolymer weight average particle size greater than 2 microns and less than 10 microns, as measured at a point immediately preceding the die, but no more than a 5:1 weight ratio of interfacial agent to fluoropolymer.

Another aspect of the instant invention is a process aid masterbatch comprising:

A) a non-fluorinated melt processable polymer;

B) 1 to 50 weight percent, based on total weight of the masterbatch, of fluoropolymer; and C) at least an effective amount, to improve processability, of interfacial agent, but no more than a 5:1 weight ratio of interfacial agent to fluoropolymer, with the proviso that if the interfacial agent is a poly(oxyalkylene) polymer, it is present at less than a 1:1 weight ratio of poly(oxyalkylene) polymer to fluoropolymer.

DETAILED DESCRIPTION OF THE INVENTION

The present invention is directed to means for improving the extrusion processability of non-fluorinated melt processable polymer compositions which contain fluoropolymer as a process aid. The term "extrusion processability" as used herein refers to the conditioning time (i.e. the elapsed time after extruder start up in which extruded articles exhibit a high degree of melt fracture before obtaining an extrudate having a smooth surface, free of melt fracture). Obviously, in order to minimize waste and reduce costs, a very short conditioning time is desirable.

Examples of non-fluorinated melt processable polymers include, but are not limited to, hydrocarbon resins, polyamides, chlorinated polyethylene, polyvinyl chloride, and polyesters. By the term "non-fluorinated" it is meant that the ratio of fluorine atoms to carbon atoms present in the polymer is less than 1:1. The non-fluorinated melt-processable polymers of this invention may be selected from a variety of polymer types. Such polymers include hydrocarbon polymers having melt indexes (measured according to ASTM D1238 at 190° C., using a 2160 g weight) of 5.0 g/10 minutes or less, preferably 2.0 g/10 minutes or less. The hydrocarbon polymers may be elastomeric copolymers of ethylene, propylene, and optionally a non-conjugated diene monomer, for example 1,4-hexadiene. In general, hydrocarbon polymers also include any thermoplastic hydrocarbon polymer obtained by the homopolymerization or copolymerization of a monoolefin of the formula $CH_2=CHR$, where R is H or an alkyl radical, usually of not more than eight carbon atoms. In particular, this invention is applicable to polyethylene, of both high density and low density, for example, polyethylenes having a density within the range 0.85 to 0.97 g/cm$^3$; polypropylene; polybutene-1; poly(3-methylbutene); poly(methylpentene); and copolymers of ethylene and alpha-olefins such as propylene, butene-1, hexene-1, octene-1, decene-1, and octadecene. Hydrocarbon polymers may also include vinyl aromatic polymers such as polystyrene. Because specific hydrocarbon polymers exhibit differing melt characteristics, the practice of this invention may have greater utility in some hydrocarbon polymers than in others. Thus, hydrocarbon polymers such as polypropylene and branched polyethylene that are not of high molecular weight have favorable melt flow characteristics even at lower temperatures, so that surface roughness and other surface defects can be avoided by adjustment of extrusion conditions. These hydrocarbon polymers may only require the use of the fluorocarbon polymer extrusion aids and process of this invention under unusual and exacting extrusion conditions. However, other polymers such as high molecular weight, high density polyethylene, linear low density polyethylene copolymers, high molecular weight polypropylene, and propylene copolymers with other olefins, particularly those with narrow molecular weight distributions, do not permit this degree of freedom in variation of extrusion conditions. It is particularly with these resins that improvements in the surface quality of the extruded product are obtained with the compositions and process of this invention.

Other non-fluorinated melt-processable polymers that may be a component of the compositions of this invention include polyamides and polyesters. Specific examples of polyamides useful in the practice of this invention are nylon 6, nylon 6/6, nylon 6/10, nylon 11 and nylon 12. Suitable polyesters include poly(ethylene terephthalate) and poly(butylene terephthalate).

The fluoropolymers useful in the compositions of this invention include elastomeric fluoropolymers (i.e. fluoroelastomers or amorphous fluoropolymers) and thermoplastic fluoropolymers (i.e. semi-crystalline fluoropolymers). Fluoroelastomers useful in this invention are fluoropolymers that are normally in the fluid state at room temperature and above, i.e. fluoropolymers which have $T_g$ values below room temperature and which exhibit little or no crystallinity at room temperature. It is preferred, but not essential, to employ fluoroelastomers having a fluorine to hydrogen ratio of at least 1:1.5. Fluorinated monomers which may be copolymerized to yield suitable fluoroelastomers include vinylidene fluoride, hexafluoropropylene, chlorotrifluoroethylene, tetrafluoroethylene and perfluoroalkyl perfluorovinyl ethers. Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art. In some cases these copolymers may also include bromine-containing comonomers as taught in Apotheker and Krusic, U.S. Pat. No. 4,035,565, or terminal iodo-groups, as taught in U.S. Pat. No. 4,243,770. The latter patent also discloses the use of iodo group-containing fluoroolefin comonomers. When fluorinated monomers are present in these copolymers in certain molar ratios, the glass transition temperature of the polymer is near or below 0° C., and the compositions are useful elastomers that are readily available articles of commerce.

Semi-crystalline fluoropolymers which may be used in the invention include, but are not limited to poly(vinylidene fluoride), homopolymers and copolymers of tetrafluoroethylene (such as Teflon® FEP fluorocarbon resin, and copolymers of tetrafluoroethylene, propylene and, optionally, vinylidene fluoride).

Multimodal fluoropolymers, such as those disclosed in International Patent Publication WO 00/69967, may also be employed as the fluoropolymer in the compositions of this invention. By "multimodal" is meant that the fluoropolymer has at least two components of discrete and different molecular weights. Both components may be amorphous or semi-crystalline, or one component may be amorphous and another component semi-crystalline.

If a single fluoropolymer is used in the compositions of this invention, the fluoropolymer must be substantially molten at the process temperature of the non-fluorinated host polymer. If a fluoropolymer blend is used, at least one of the blend components must meet this criterion. To function effectively as a process aid at weight average particle sizes as low as about 2 microns, an upper limit on the viscosity of the molten component of the process aid exists. If the molten component of the process aid is a fluoroelastomer, the Mooney viscosity (measured per ASTM-D1646 at 121° C., large rotor, condition ML 1+10 minutes) must be 80 or less, preferably 60 to 80. If the molten component of the process aid is semi-crystalline, the melt index (ASTM D-1238, 265° C., 5 kg weight) must be greater than 0.5 dg/min, preferably in the range 0.5 to 3 dg/min. Fluoropolymers become increasingly difficult to spread on the internal surfaces of process equipment as the fluoropolymer viscosity increases. Thus, beyond these viscosity limits, the process aid performance is degraded unless the weight average particle size of the fluoropolymer delivered to the die is extremely large, greater than about 10 microns. Fluoropolymer particles of this size are often large enough to form surface distortions or internal flaws in the extrudate. Therefore, it is desirable to restrict the weight average particle size of the fluoropolymer to less than 10 microns.

In the present invention it is desirable to control the weight average particle size of fluoropolymer process aid in the composition which is to be extruded so that it is greater than 2 microns, but less than 10 microns, when the composition reaches a point in the process immediately preceding the die (i.e. at the die entrance). Preferably, the weight average particle size of fluoropolymer is greater than 4 microns (and most preferably, greater than 6 microns) as measured just prior to the die.

Weight average particle size (diameter) is defined by the equation $$A = (\Sigma_i w_i X_i),$$

wherein A is weight average particle size (diameter); $w_i$ is the weight fraction of fluoropolymer particles in a particular sample having particle diameters in the range defined by $X_i$; and $X_i$ is specified by dividing the particle diameter range in the sample into i intervals and assigning $X_i$ to be the mean particle diameter of the range of particle sizes encompassed by the $i^{th}$ interval. $W_i$ may be determined by a number of means including a) examining fluoropolymer dispersions using a light microscope, a digitizing camera, and a hot stage to melt the carrier resin, b) using a Confocal Laser microscope to image the fluoroelastomer particles in three dimensions, followed by size analysis using appropriate software c) analyzing photomicrographs of fluoropolymer dispersions, or d) by first dissolving the matrix resin, separating the fluoropolymer particles from matrix polymer resin, and then measuring particle size distribution by light scattering or some other known technique. When $w_i$ is calculated from photomicrographs, absent other knowledge to the contrary, the particles may be assumed to be substantially spherical in shape.

Although statistical moments of distributions are widely used in polymer science, these tools have not heretofore been applied to the field of fluoropolymer process aids. For example, in The Elements of Polymer Science and Engineering by Alfred Rudin (Academic Press, 1982) the number average molecular weight of a polymer is defined by the ratio of the first moment to the zeroth moment of the molecular weight distribution, while the weight average molecular weight is defined by the ratio of the second moment to the first moment of the molecular weight distribution. The number and weight averages correspond to the arithmetic mean of the number or weight distribution. Characterizing the fluoropolymer particle size distribution using a weight average rather than a number average is appropriate for the present invention, because, as described by Migler et al. (J. Rheol. 45(2), March/April 2001), fluoropolymer process aids function by depositing a fluoropolymer coating on internal die surfaces. Since the present invention is based on the discovery that, at equal fluoropolymer concentrations, large particles transfer fluoropolymer mass to the die surface more quickly than small particles, the salient quality of a particle distribution for process aids is a measure of where the majority of the fluoropolymer mass lies in the size distribution.

Furthermore, because statistical methods for particle size analysis have not been previously used in the field, prior references generally describe the fluoropolymer dispersion in terms of a size range. Unfortunately, a size range provides no information as to the weight average particle size of the distribution, other than indicating that the weight average must lie within the given range. A prior art extrudable composition that contains a minor amount of fluoropolymer particles greater than 2 microns in size, but having a majority of fluoropolymer particles less than 2 microns, would not provide the improvement in conditioning time seen with compositions of the present invention.

For ease of processing, fluoropolymer process aids are often in the form of a masterbatch, rather than neat, when they are added to the non-fluorinated melt processable polymer to form the composition which is to be extruded. A master batch is a dispersion (mixture) of fluoropolymer in a diluent polymer. The diluent polymer can be the same non-fluorinated melt-processable polymer that is to be extruded, or it can be a second non-fluorinated melt processable polymer that does not deleteriously affect the extrusion behavior of the first non-fluorinated melt processable polymer/process aid composition. Masterbatches typically contain 1–50 wt. % (preferably 1–30 wt. %) fluoropolymer processing aid (based on the total weight of the masterbatch). Masterbatches can be made, for example, by mixing the appropriate amount of fluoropolymer with diluent polymer in a mixer, such as a Banbury® mixer, at a temperature above the melting point of the non-fluorinated melt processable polymer, so as to form a masterbatch. Depending on masterbatch concentration, composition, and mixing conditions, the weight average particle size of fluoropolymer in a masterbatch of the prior art may be less than or greater than 2 microns. In preparing masterbatches that may be employed in the extrudable compositions of this invention, it is important to minimize exposure of the fluoropolymer to high shear, particularly for low fluoropolymer concentration masterbatches (i.e. those containing less than about 5 wt. % fluoropolymer). Otherwise, the weight average particle size of the fluoropolymer may be reduced to less than 2 microns in the masterbatch.

The rate at which a fluoropolymer process aid masterbatch is fed to an extruder is controlled so that the level of fluoropolymer in the resulting extrudable composition is between 25 to 2000 ppm (preferably 25 to 1000 ppm) by weight, based on the total weight of the extrudable composition.

There are several possible means for achieving the desirable fluoropolymer weight average particle size of greater than 2 microns, but less than 10 microns, as measured in the extrudable composition at a point near the die. One such means, an aspect of this invention, is a novel extrudable composition comprising a non-fluorinated melt processable polymer; and 25–2000 ppm by weight, based on the total weight of the extrudable composition, of fluoropolymer, wherein the fluoropolymer has a weight average particle size greater than 2 microns (preferably greater than 4 microns, most preferably greater than 6 microns), but less than 10 microns, as measured at a point immediately preceding the die (i.e. the die entrance). This extrudable composition is substantially free of interfacial agent (as hereinafter defined). By "substantially free" is meant 0 to about 10 parts per million by weight interfacial agent, based on the total weight of the extrudable composition.

This extrudable composition of the invention may be made in a process wherein fluoropolymer (having a weight average particle size prior to introduction into the extruder of greater than 2 microns, preferably greater than 4 microns, most preferably greater than 6 microns) is introduced (either neat or in a masterbatch) to and mixed with non-fluorinated melt processable polymer to form an extrudable composition containing 25–2000 ppm fluoropolymer. Mixing the non-fluorinated polymer with the fluoropolymer, and pumping the resulting composition to the die, is performed in such a manner that the fluoropolymer is exposed to high shear for a minimal amount of time and thus, the fluoropolymer weight average particle size remains greater than 2 microns when the extrudable composition reaches the die entrance.

Care must be taken not to over process the extrudable composition containing the fluoropolymer before it reaches the die entrance. Otherwise, what may have started out as a large weight average particle size fluoropolymer when it was fed to the extruder, could be on the order of 1 micron (or less) when it reaches the die. Over processing includes any process wherein the fluoropolymer process aid is exposed to dispersive mixing conditions for too long. Over processing can take place in some types of polymer mixing devices such as fully intermeshing twin screw extruders, Buss Kneaders®, single screw extruders equipped with screws which incorporate built in mixing devices (e.g. Maddock elements, pin mixers, ring elements, reverse flights), and single screw extruders having fine screen packs or restrictive dies that generate high pressure (i.e. >20 MPa) at the extruder exit. Preferably, processing will take place in a single screw extruder, with or without screw mounted mixing elements. Most preferably, screw mounted mixing elements and downstream mixing devices should be absent.

Because all extrusion processes may potentially degrade the fluoropolymer particle size, it is desirable to introduce the fluoropolymer to the extruder while in a particularly coarse state, such as a pellet, coarsely ground powder, or a masterbatch containing fluoropolymer particles having a weight average particle size much greater than 2 microns. To minimize dispersion and improve conditioning speed, the fluoropolymer viscosity at the extrusion processing conditions should be about equal to or greater than the viscosity of the non-fluorinated melt processable thermoplastic polymer. For example, a coarsely ground fluoropolymer may be dry blended at 25 ppm to 2000 ppm with a polyethylene resin, and fed to a single screw extruder. The extruder screw should have a low compression ratio (3:1 or less) and contain no mixing elements. Downstream of the screw, the polymer flow path should present minimal restrictions other than the die itself.

A preferred means in which to ensure that the weight average particle size of the fluoropolymer will be greater than 2 microns when it reaches the die is to introduce an interfacial agent into either the masterbatch or the extrudable composition. The interfacial agent somehow stabilizes the particle size of the fluoropolymer so that the fluoropolymer particles are less sensitive to high shear environments such as mixing. By "interfacial agent" is meant a thermoplastic polymer which is characterized by 1) being in the liquid state (or molten) at the extrusion temperature, 2) having a lower melt viscosity than both the non-fluorinated melt processable polymer and fluoropolymer process aid, and 3) freely wets the surface of the fluoropolymer particles in the extrudable composition. Examples of such interfacial agents include, but are not limited to i) silicone-polyether copolymers; ii) aliphatic polyesters such as poly(butylene adipate), poly(lactic acid) and polycaprolactone polyesters (preferably, the polyester is not a block copolymer of a dicarboxylic acid with a poly(oxyalkylene) polymer); iii) aromatic polyesters such as phthalic acid diisobutyl ester; iv) polyether polyols (preferably, not a polyalkylene oxide) such as poly(tetramethylene ether glycol); v) amine oxides such as octyldimethyl amine oxide; vi) carboxylic acids such as hydroxy-butanedioic acid; vii) fatty acid esters such as sorbitan monolaurate and triglycerides; and viii) poly (oxyalkylene) polymers. As used herein, the term "poly (oxyalkylene) polymers" refers to those polymers and their derivatives that are defined in U.S. Pat. No. 4,855,360. Such polymers include polyethylene glycols and their derivatives.

A preferred aliphatic polyester interfacial agent is a polycaprolactone having a number average molecular weight in the range 1000 to 32000, preferably 2000 to 10000, and most preferably 2000 to 4000.

The interfacial agent is a relatively low molecular weight ingredient which, for a particular system of fluoropolymer process aid and non-fluorinated melt processable polymer, preferentially locates at the interface between these two polymers. While not wishing to be bound by any particular explanation, it is believed that the interfacial agent functions by reducing the shear stress on the fluoropolymer particles during melt processing of the non-fluorinated polymer, thereby reducing the ability of melt processing equipment to affect the dispersion of the fluoropolymer. The interfacial agent may be introduced to the mixture of fluoropolymer and non-fluorinated polymer at any point up to and including the final melt shaping process, with the proviso that at the point of introduction, the weight average particle size of fluoropolymer particles must be greater than 2 microns. It is most desirable to combine the fluoropolymer and interfacial agent in a masterbatching step where both ingredients are present at high concentration (i.e. at greater than or equal to 1 wt. %, based on the total weight of masterbatch), so that the wetting of the fluoropolymer surface in the mixture occurs quickly.

Accordingly, another aspect of the invention is a masterbatch comprising a) non-fluorinated melt processable polymer; b) 1 to 50 weight percent, based on the total weight of the masterbatch, of fluoropolymer; and c) at least an effective amount of an interfacial agent to improve processability. By "at least an effective amount" is defined as any amount of interfacial agent present in the masterbatch which, when the masterbatch is mixed with a non-fluorinated melt processable polymer, results in an extrudable composition that provides a measurable reduction in conditioning time for removal of all surface melt fracture during extrusion, as compared to the same composition not containing interfacial agent. Generally, there is no benefit in extrusion processability by incorporating into the masterbatch more interfacial agent than 5 times the level of that of the fluoropolymer process aid (i.e. a weight ratio of interfacial agent to fluoropolymer up to 5:1 in the composition). If the interfacial agent is a poly(oxyalkylene) polymer, preferably the weight ratio of interfacial agent to fluoropolymer is less than 1:1 in the masterbatch.

Another aspect of the present invention is a composition comprising a) fluoropolymer and b) polycaprolactone. Such a blend may be utilized in the manufacture of masterbatches, or as an additive to be introduced directly into an extrudable composition. Preferably, the weight ratio of polycaprolactone to fluoropolymer is no greater than 5:1 in this composition. Preferably, the polycaprolactone employed in this aspect of the invention has a number average molecular weight in the range 1000 to 32000, more preferably 2000 to 10000, and most preferably 2000 to 4000. These blends may be made by a variety of methods including admixing pellets or powders of fluoropolymer and polycaprolactone, or encapsulating fluoropolymer granules with a coating of polycaprolactone.

Another aspect of the present invention is an extrudable composition for passing through a die, said composition comprising a) non-fluorinated melt processable polymer; b) 25 to 2000 ppm by weight, based on the total weight of the extrudable composition, of fluoropolymer, said fluoropolymer having a weight average particle size (as measured at a point immediately preceding the die) of greater than 2 microns (preferably greater than 4 microns, most preferably greater than 6 microns), but less than 10 microns; and c) at least an effective amount of an interfacial agent to achieve a weight average fluoropolymer particle size greater than 2 microns, but less than 10 microns, as measured at a point immediately preceding the die. The upper level of interfacial agent present in the extrudable composition is a weight ratio of interfacial agent to fluoropolymer of 5:1, and, preferably, the latter ratio is less than 1:1 when the interfacial agent is a poly(oxyalkylene) polymer.

The compositions of the invention are particularly useful in extrusions of melt processable polyolefins. Such extrusion processes are commonly used in manufacture of blown films and wire and cable jacketing.

EXAMPLES

The following examples illustrate the significant improvement in extrusion processability, as evidenced by lower conditioning times and lower die pressure, when the weight average particle size of fluoropolymer process aid is greater than 2 microns as it reaches the die.

The materials used in these examples were as follows:

The non-fluorinated melt processable polymer was either (a) a high molecular weight linear low density polyethylene, i.e. a linear low density (d=0.918) copolymer of ethylene and 1-butene having a melt index (ASTM D-1238, condition E) of 1.0 (hereinafter referred to as "LLDPE-1"), or (b) an ethylene-octene linear low density polymer with a melt index of 25.0, and density 0.917 g/cc (LLDPE-2).

The fluoropolymer process aids used were fluoroelastomers, either alone or in combination with a thermoplastic fluoropolymer. Fluoroelastomers (FE-1, FE-2, and FE-3) were copolymers of vinylidene fluoride and hexafluoropropylene, in a 60/40 weight ratio. FE-1 had a Mooney viscosity of 55, FE-2 had a Mooney viscosity of 40, and FE-3 had a Mooney viscosity of 75 (all measured per ASTM D-1646, large rotor, condition ML 1+10 minutes, measured at 121° C.). The thermoplastic fluoropolymer (FP) was a low molecular weight, non-fibrillating grade of polytetrafluoroethylene, with a peak melting temperature (ASTM D4894) of 325° C.±5° C.

Some of the interfacial agents employed were polycaprolactone (PCL) polymers that were derived from the ring opening reaction of epsilon-caprolactone, initiated by 1,4-butanediol.

PCL-1 was a 1000 number average molecular weight polycaprolactone diol.

PCL-2 was a 2000 number average molecular weight polycaprolactone diol.

PCL-3 was a 4000 number average molecular weight polycaprolactone diol.

PCL-4 was a 32000 number average molecular weight polycaprolactone diol.

Another interfacial agent used in the examples was PEG, a polyethylene glycol with a number average molecular weight of about 8000, sold under the trade name Carbowax™ 8000 (Union Carbide Corp.)

Example 1

Masterbatches of the invention (coded MB-1, etc.) and controls (coded MB-A, etc.) were produced from the compositions shown in Table I (values are weight percent), using a 28 mm co-rotating twin screw extruder operating at 300 revolutions per minute (rpm) and 200° C. to melt mix the ingredients. The extruded strands were cooled in a water bath and pelletized.

TABLE I

| Material | MB-A | MB-1 | MB-2 | MB-3 | MB-4 | MB-B | MB-C | MB-D | MB-5 | MB-6 | MB-E |
|---|---|---|---|---|---|---|---|---|---|---|---|
| LLDPE-1 | 99 | 98.75 | 98.5 | 98 | 96 | 96.39 | 98.5 | 95 | 95 | 95 | 95 |
| FE-1 | 0.96 | 0.96 | 0.96 | 0.96 | 0.96 | 0 | 0 | 0 | 0 | 0 | 0 |
| FE-2 | 0 | 0 | 0 | 0 | 0 | 0 | 1.5 | 1.5 | 1.5 | 1.5 | 1.5 |
| FP | 0.04 | 0.04 | 0.04 | 0.04 | 0.04 | 0 | 0 | 0 | 0 | 0 | 0 |
| PCL-1 | 0 | 0 | 0 | 0 | 0 | 0 | 0 | 3.5 | 0 | 0 | 0 |
| PCL-2 | 0 | 0 | 0 | 0 | 0 | 0 | 0 | 0 | 3.5 | 0 | 0 |
| PCL-3 | 0 | 0.25 | 0.5 | 1 | 3 | 3.61 | 0 | 0 | 0 | 3.5 | 0 |
| PCL-4 | 0 | 0 | 0 | 0 | 0 | 0 | 0 | 0 | 0 | 0 | 3.5 |

Extrusion processability evaluations were carried out on a C.W. Brabender Instruments Inc. Computerized Plasti-Corder equipped with a 19.1 mm (¾ inch) diameter extruder with a 25/1 length to diameter ratio. Unless otherwise specified, the extruder screw had 15 feed flights, 5 transition flights, 5 metering flights, a compression ratio of 3:1, and no mixing elements. Operating parameters were controlled by four independent heating zones, one pressure transducer, and a torque-measuring drive unit equipped with 1–120 rpm capability. The extruder was fitted with a 2.54 cm (1 inch) slot die having a 0.51 mm (0.020 inch) die gap and a land length of 1.016 cm (0.4 inches), to produce a continuous polyethylene tape. This equipment set-up contained no elements specially intended to promote mixing during extrusion. Thus the equipment provided a high sensitivity to the particle size of the fluoropolymer process aid fed to the extruder, since the extruder had only limited ability to alter the size of the fluoropolymer before it reached the die.

In operation, the die temperature was set to 204° C., and the extruder barrel temperatures were set at 160° C. (feed zone), 180° C. (middle), and 200° C. (exit). The extruder screw speed was held constant at 45 rpm. Die pressure and extruder torque were recorded by computer automatically at one minute intervals throughout the test. Experiments were carried out by establishing a baseline condition of 100% melt fracture using pure LLDPE-1 feed (i.e. contained no fluoropolymer process aid or interfacial agent), and allowing the extruder output and die pressure to reach steady state. The feed was then switched to a dry blend of the LLDPE-1 and masterbatch under evaluation, and a digital timer with a one second readout was started to measure the conditioning time. Samples of extrudate were taken at intervals, and the percent of surface area of the tape covered by melt fracture defects was evaluated by visual inspection with a 30×illuminated magnifying lens. The tests were run for 60 minutes. Extrudate samples were always taken at the 60 minute mark, and the time required to achieve 0% melt fracture (i.e. the conditioning time) was recorded if this state was achieved during the test.

Upon completion of the test, the feed was switched to an abrasive purge compound containing 60% synthetic silica in polyethylene (KC-60, A. Schulman Inc.) to remove fluoropolymer process aid from the extruder and die. After a thorough purging (30 to 45 minutes), the pure LLDPE-1 was re-introduced to establish that the baseline conditions of die pressure, output, and melt fracture had been recovered. To ensure that no silica particles remain in the test extruder to potentially obscure the particle size measurements, the extruder and die were then disassembled and cleaned. The extruder barrel was scrubbed with a wire brush, followed by a cloth damp with xylene. All polymer was removed from the screw and die using high pressure air containing a particulate blasting media.

Fluoroelastomer particle size distributions were measured using a Nikon Microphot-SE compound microscope operated with standard reflective light and a 40×objective configured for digital acquisition. Overall magnification was 400×. Illumination was provided by a Nikon Transformer model UN set to position 4. Images were captured and digitized using a Sony video camera model DXC-760 MD with DXC-750 control, and displayed on a computer monitor using a Matrox Meteor Graphics card with Intellicam 2.0 software. A portable hot stage, model HS400 from Instec Inc., was placed on the microscope stage. The hot stage temperature was 220° C.

To measure a particle size distribution, a thin slice (~0.5 mm) of the sample to be analyzed was cut with a razor blade, perpendicular to the direction of extrusion. The slice was placed on the hot stage platen and allowed to equilibrate. Fluoroelastomer particles were imaged by moving the focal plane through the thickness of the sample. To avoid counting dirt particles, only focal planes within the interior of the sample were analyzed. When analyzing extrudable compositions, typically five to fifteen fluoroelastomer particles were in focus at any given focal plane. In some samples, the fluoroelastomer particles were not uniformly distributed within the sample, and a survey was taken at lower magnification to determine areas rich in fluoroelastomer particles. Masterbatch compositions contained greater numbers of particles at a given focal plane, depending on the masterbatch concentration.

Fluoroelastomer particle sizes were determined by visually estimating the diameter relative to a 10 micron scale with 2 micron increments displayed along side the sample image on the computer screen. The smallest particle size categorized by this technique was 0.5 microns. Particle diameters greater than 0.5 microns were measured to the nearest whole micron. Up to particle sizes of about 5 microns, the particles appeared uniformly circular on the digitized image. Although many particles larger than 5 microns were circular, some large particles had an elongated shape. In these cases, the longest dimension was taken to be the particle diameter. From time to time, an angular or irregular particle was found in a sample. These were not analyzed, under the assumption that they were not fluoroelastomer. For each sample, 100 to 150 particles were counted.

Control samples of extrudate with no fluoroelastomer were taken at the start of each extrusion run. These were examined as described above to ensure there was no contamination that could affect the particle size measurements. At the completion of the extrusion test (i.e., after melt fracture had completely cleared, or 60 minutes of extrusion had elapsed), the extruder screw speed was set to zero and the die was removed. The screw speed was then set to about 10 rpm, so that the material in the die adapter Oust upstream of the die) was slowly extruded. About five grams of extrudate were collected in this manner, allowed to cool without disturbance, and subsequently used to characterize the fluoroelastomer particles being delivered to the die for that extrusion test.

Masterbatches MB-1, MB-2, MB-3, and MB-4 of the invention were formed into extrudable compositions of the invention (EC-1–EC-4) by dry blending them, at 2 wt. % level, with LLDPE-1, thus yielding compositions containing 200 ppm total of fluoropolymer process aids FE-1 and FP and between 50 to 600 ppm interfacial agent PCL-3. A control extrudable composition (EC-A) was made in the same manner by blending 2 wt. % masterbatch MB-A with LLDPE-1, resulting in a composition containing 200 ppm fluoropolymer process aid, but no interfacial agent. A second control extrudable composition (EC-B) was made by dry blending masterbatch MB-B, at 1.33 wt. % level, with LLDPE-1, yielding a composition which contained 480 ppm interfacial agent PCL-3, but no fluoropolymer process aid. Table II lists the results of extrusion testing and particle size measurements, as described above, on these extrudable compositions.

TABLE II

| Extrudable Composition | Master-batch | Weight Average particle size delivered to the die (microns) | Particle size range delivered to the die (microns) | % Melt fracture at test completion | Conditioning Time (min) | Die Pressure (MPa) at test completion |
|---|---|---|---|---|---|---|
| EC-A | MB-A | 1.8 | 0.5 to 3 | 3 | >60 | 13.2 |
| EC-1 | MB-1 | 2.9 | 0.5 to 4 | 0 | 41 | 11.5 |
| EC-2 | MB-2 | 3.7 | 1 to 6 | 0 | 44 | 10.9 |
| EC-3 | MB-3 | 2.7 | 1 to 4 | 0 | 30 | 10.7 |
| EC-4 | MB-4 | 4.9 | 1 to 8 | 0 | 11 | 11.2 |
| EC-B | MB-B | no particles | no particles | 100 | >60 | 19.9 |

The results in Table II show that the extrudable compositions of the invention (EC-1–EC-4), containing both interfacial agent PCL-3 and fluoropolymer process aids FE-1 and FP, decreased the time required to eliminate melt fracture defects on the extruded tape and decreased die pressure versus Control EC-A which contained only fluoropolymer process aid without interfacial agent. Control EC-B, having only interfacial agent PCL-3 and no fluoropolymer process aid, had no effect on melt fracture defects, and die pressure was worse (i.e. higher) than that of Control EC-A. PCL-3 effectively prevented the reduction of the fluoroelastomer particles during masterbatch compounding and the extrusion experiment to a weight average size below 2 microns, thereby improving the performance of the fluoroelastomer process aid. In addition, the performance of the process aids correlated with the weight average fluoroelastomer particle size delivered to the die during the extrusion experiment. For example, although EC-A did contain particles larger than 2 microns, there were insufficient quantities of these particles to raise the weight average particle size above the 2 micron threshold, and this extrudable composition showed inferior conditioning time, as well as higher die pressure at test completion as compared to the compositions of the invention containing fluoroelastomer particles with a weight average size of greater than 2 microns.

Example 2

Extrudable compositions of the invention (EC-5 and EC-6) and control extrudable compositions (EC-C–EC-E) were made from masterbatches MB-5, MB-6, MB-7, MB-8 and MB-C (respectively) by dry blending 1.33 wt. % masterbatch with LLDPE-1, resulting in 200 ppm FE-2 fluoropolymer process aid and either 0 (in Control C) or 465 ppm PCL interfacial agent (in EC-5 and EC-6, and in EC-D and EC-E) of varying molecular weight in all the extrudable compositions. Table III lists the results of extrusion testing and particle size measurements performed according to the methods described in Example 1.

The results listed in Table III show that the entire molecular weight range tested of the PCL interfacial agent (in combination with fluoropolymer process aid) improved the extrusion processability by reducing melt fracture, conditioning time and die pressure. However, at least when used in combination with fluoropolymer FE-2, polycaprolactone having number average molecular weights of 2000 (PCL-2) and 4000 (PCL-3) were more effective than polycaprolactone having number average molecular weights of either 1000 or 32,000 in preventing the breakdown of fluoroelastomer particles to small sizes. The increased fluoroelastomer particle size (greater than 2.0 microns weight average) in turn provides faster elimination of melt defects and lower die pressures in formulations containing PCL-2 or PCL-3, as compared with those containing PCL-1 or PCL-4.

Example 3

Masterbatch compositions shown in Table IV (values are in weight percent) were produced using a 28 mm co-rotating twin screw extruder operating at 300 rpm and 200° C. to melt mix the ingredients. The extruded strands were cooled in a water bath and pelletized. By increasing the concentration of FE-1 in the masterbatch, the size of the fluoroelastomer particles in the masterbatch was increased. When the amount of dispersive mixing in the Brabender® extruder was insufficient to reduce the large fluoroelastomer particles present in the masterbatch to a weight average diameter of less than 2 microns (at the die entrance), masterbatches containing large particles eliminated melt fracture defects more quickly than masterbatches containing small fluoroelastomer particles. MB-9 and MB-10 demonstrated that the fluoroelastomer particle size in the masterbatch may also be increased by maintaining low fluoroelastomer concentration (same as MB-G and MB-H), while increasing the melt index of the polyethylene used during compounding of the masterbatch. A third method of producing large fluoroelastomer particles and delivering them to the die was demonstrated by MB-11, in which a higher viscosity fluoroelas-

TABLE III

| Extrudable Composition | Master-batch | Weight Average particle size delivered to the die (microns) | % Melt fracture at test completion | Conditioning Time (min) | Die Pressure (MPa) at test completion |
|---|---|---|---|---|---|
| EC-C | MB-C | 1.6 | 50 | >60 | 18.7 |
| EC-D | MB-D | 1.5 | 1 | >60 | 13.4 |
| EC-5 | MB-5 | 6.5 | 0 | 9 | 10 |
| EC-6 | MB-6 | 5.1 | 0 | 9 | 11.2 |
| EC-E | MB-E | 1.9 | 30 | >60 | 16.4 | tomer (FE-3) was used at relatively low concentration (same as MB-G). Because the FE-3 was more difficult to disperse than FE-1, the MB-11 masterbatch delivered larger fluoroelastomer particles to the die, and eliminated melt defects more quickly than MB-G.

Confocal microscope. Using the 488 nm laser line for excitation, three dimensional images of the particles were captured and analyzed using a Khoros software package. The smallest resolvable particle dimension using this equipment was 1 micron.

TABLE IV

|         | MB-F | MB-G | MB-H | MB-7 | MB-8 | MB-9 | MB-10 | MB-11 |
|---------|------|------|------|------|------|------|-------|-------|
| LLDPE-1 | 99.9 | 99   | 95   | 88   | 75   |      |       | 99    |
| LLDPE-2 |      |      |      |      |      | 99   | 95    |       |
| FE-1    | 0.1  | 1    | 5    | 12   | 25   | 1    | 5     |       |
| FE-3    |      |      |      |      |      |      |       | 1     |

Extrudable compositions of this invention (EC-7 through EC-11) and control compositions (EC-F, EC-G, EC-H, EC-I and EC-J) were made by dry blending masterbatches MB-7 through MB-11 and MB-F through H with non-fluorinated melt processable polymer in the proportions shown in Table V (values are in weight percent), to produce ten extrudable compositions, each having a uniform level of 200 ppm FE-1 or FE-3 process aid.

TABLE V

|         | EC-F | EC-G | EC-H | EC-7  | EC-8  | EC-9 | EC-10 | EC-I  | EC-J  | EC-11 |
|---------|------|------|------|-------|-------|------|-------|-------|-------|-------|
| LLDPE-1 | 80   | 98   | 99.6 | 99.83 | 99.92 | 98   | 99.6  | 96.02 | 99.22 | 98    |
| LLDPE-2 |      |      |      |       |       |      |       | 1.98  | 0.38  |       |
| MB-F    | 20   |      |      |       |       |      |       |       |       |       |
| MB-G    |      | 2    |      |       |       |      |       | 2     |       |       |
| MB-H    |      |      | 0.4  |       |       |      |       |       | 0.4   |       |
| MB-7    |      |      |      | 0.17  |       |      |       |       |       |       |
| MB-8    |      |      |      |       | 0.08  |      |       |       |       |       |
| MB-9    |      |      |      |       |       | 2    |       |       |       |       |
| MB-10   |      |      |      |       |       |      | 0.4   |       |       |       |
| MB-11   |      |      |      |       |       |      |       |       |       | 2     |

Table VI shows the results of extrusion tests and particle size measurements using compositions EC-F through EC-J, and EC-7 through EC-11, performed as described previously in Example 1. To confirm the accuracy of the particle size measurement procedure described in Example 1, the fluoroelastomer particles in one of the samples (EC-7) was additionally characterized using a Carl Zeiss LSM 510

TABLE VI

| Extrudable Composition | Masterbatch Composition | Weight Average particle size in the masterbatch (microns) | Weight Average particle size delivered to the die (microns) | % Melt Fracture at test completion | Conditioning Time (min.) | Die Pressure (MPa) at test completion |
|---|---|---|---|---|---|---|
| EC-F  | MB-F  | 2    | 2    | 35 | >60 | 17.3 |
| EC-G  | MB-G  | 1.7  | 1.7  | 40 | >60 | 17.8 |
| EC-H  | MB-H  | 2.1  | 2    | 30 | >60 | 16.8 |
| EC-7  | MB-7  | 4.1  | 4.8* | 0  | 25  | 12   |
| EC-8  | MB-8  | 13.1 | 6.6  | 0  | 22  | 10.6 |
| EC-9  | MB-9  | 4.6  | 6    | 0  | 20  | 11.2 |
| EC-10 | MB-10 | 7.3  | 6.6  | 0  | 14  | 10.5 |
| EC-I  | MB-G  | 1.7  | nm   | 20 | >60 | 15.7 |
| EC-J  | MB-H  | 2.1  | nm   | 5  | >60 | 14.3 |
| EC-11 | MB-11 | nm   | 2.3  | 0  | 45  | 12.3 | nm = not measured
*4.56 u measured by confocal laser technique, 1100 particle counts The results of extrusion tests on compositions of the invention (EC-7 through EC-11) show surprising improvements (vs. controls EC-F through EC-J) in elimination of melt defects and die pressure reduction. Controls EC-F, G, and H, and Samples EC-7 through 11 show that these process improvements were the result of increasing, above the 2 micron threshold, the weight average particle size of the fluoroelastomer process aid delivered to the die. Measurements of the fluoroelastomer particle sizes in masterbatches MB-F, G, and H, and MB 7 and 8, confirmed that the fluoroelastomer dispersion became increasingly coarse with increasing fluoroelastomer concentration in the masterbatch. With the extruder configuration used in Examples 1 through 3, increasing weight average particle size of the fluoroelastomer in the masterbatch yielded a corresponding increase in the fluoroelastomer particle size delivered to the die.

EC-9 and EC-10 demonstrated that increasing coarseness of the fluoroelastomer dispersion may also be achieved by increasing the melt index of the polyethylene used for masterbatch production, without increasing the level of fluoropolymer process aid. Use of a high melt index non-fluorinated melt processable polymer as a carrier for the masterbatch is expected to decrease the dispersive mixing capability of the twin screw extruder used for masterbatch production, thereby producing a coarser fluoroelastomer dispersion than if a lower melt index (e.g. 1.0 MI) resin were used. Comparative examples EC-I and J showed that equivalent amounts of the 25 melt index LLDPE introduced during extrusion testing with the finely dispersed masterbatches of equivalent fluoroelastomer concentration (MB-E and MB-F) did not yield the quick elimination of melt defects and large reduction in die pressure shown by compositions of the invention EC-9 and EC-10.

EC-11 demonstrated that by increasing the viscosity of the fluoroelastomer, weight average particle sizes greater than 2 microns may be delivered to the die even when the concentration of fluoroelastomer in the masterbatch was low. EC-11 also showed that a weight average fluoroelastomer particle size slightly greater than 2 microns was more effective than weight average particle sizes of 2 microns or less, but not as effective as the very large fluoroelastomer particles (4 microns and greater) shown in Examples 1 through 3.

Analysis of the fluoroelastomer particle size delivered to the die in EC-7 showed the manual particle counting technique described in Example 1 and the automated technique using the Laser Confocal microscope to be in reasonable agreement.

Example 4

The compositions of MB-12 of the invention, and comparative masterbatches MB-I, and MB-J are shown in Table VII. Values are in weight percent. Masterbatches MB-12 and MB-J were produced on a twin screw extruder by the process described in Example 1. Masterbatch MB-I was produced on a twin screw extruder as described in Example 1, except that the processing temperature was 280° C., rather than 200° C., while all other compounding parameters remained unchanged. This higher processing temperature is typical of the temperature achieved in pelletizing extruders used during commercial polyethylene production. Fluoropolymer process aids are frequently incorporated into polyethylene resins by direct addition (i.e., no masterbatch is used) into the hopper of the pelletizing extruder.

TABLE VII

|        | MB-12 | MB-I | MB-J  |
|--------|-------|------|-------|
| LLDPE-1 | 96   | 96   | 96.39 |
| FE-1   | 1     | 1    | 0     |
| PEG    | 3     | 3    | 3.61  |

The extrudable compositions shown in Table VIII were produced by the process described in Example 1. Extrudable composition EC-12 is a composition of this invention, while the others are comparative compositions. Values in Table VIII are in weight percent. EC-12, EC-K, and EC-M contained 200 ppm of FE-1 and 600 ppm PEG. EC-L contained 480 ppm PEG, but no fluoroelastomer.

TABLE VIII

|         | EC-12 | EC-K  | EC-L  | EC-M |
|---------|-------|-------|-------|------|
| LLDPE-1 | 98    | 96.34 | 98.67 | 98   |
| MB-12   | 2     |       |       |      |
| MB-G    |       | 2     |       |      |
| MB-I    |       |       |       | 2    |
| MB-J    |       | 1.66  | 1.33  |      |

The extrusion experiment results summarized in Table IX illustrate the effect of increasing the amount of dispersive mixing during compounding and extrusion, and the role of an interfacial agent such as PEG in preventing fluoroelastomer particle break-up in the presence of such dispersive mixing. In addition, these experiments show that an extrudable composition containing a process aid comprised of fluoroelastomer and PEG, where the PEG to fluoroelastomer ratio of the process aid is 3.0 and the fluoroelastomer weight average particle size is 2 microns or less, does not produce the fast elimination of melt fracture defects and large pressure reduction characterized by compositions of this invention.

To alter the amount of dispersive mixing during the extrusion experiments, two different extruder screws were used. The first screw, herein referred to as a metering screw, is described in Example 1. The second screw, herein referred to as a Maddock screw, contained a Maddock mixing element on the discharge end. The Maddock screw was 25:1 L/D with 10 feed flights, 5 transition flights, 5 metering flights, and a Maddock mixer encompassing the last five diameters of the screw. To maintain equal extruder output and shear rates in the die, the extruder screw speed was set to 52 rpm for the Maddock screw, compared with 45 rpm (as described in Example 1) when using the metering screw. All other extrusion test parameters remained unchanged between runs with different screws. Screws containing mixing elements such as a Maddock tip are frequently used during extrusion of articles such as thin films, to ensure good dispersion of additives such as pigments (e.g., TiO2) or anti-block (e.g., silica or talc). Because of the small die gaps necessary to extrude these thin films, such articles frequently use fluoropolymer process aids to eliminate melt defects and reduce die pressure in order to increase production rates.

TABLE IX

| Extrudable Composition | Weight Average particle size in the masterbatch (microns) | Weight Average particle size delivered to the die (microns) | % Melt Fracture at test completion | Conditioning Time (min.) | Die Pressure (MPa) at test completion | Extruder Screw type |
|---|---|---|---|---|---|---|
| EC-8 | 13.1 | 6.6 | 0 | 22 | 10.6 | Metering |
| EC-8 | 13.1 | 1.0 | 2 | >60 | 12.5 | Maddock |
| EC-12 | 3.0 | 3.1 | 0 | 40 | 11.2 | Metering |
| EC-12 | 3.0 | 3.5 | 0 | 50 | 11.9 | Maddock |
| EC-K | 1.7 | 1.4 | 30 | >60 | 16.6 | Metering |
| EC-L | no particles | no particles | 100 | >60 | 19.2 | Metering |
| EC-M | 2.2 | 1.9 | 25 | >60 | 14.5 | Maddock |

As indicated in Table IX, EC-8, when tested using the Maddock screw, showed that a large fluoroelastomer particle size entering the extruder in the masterbatch is not necessarily sufficient to ensure good process aid performance. In this example, the Maddock screw dispersed the fluoroelastomer to a weight average particle size of 1.0 micron, and the composition did not eliminate melt defects within one hour. Note that EC-8, when tested using the metering screw in Example 3, did deliver large fluoroelastomer particles to the die, and eliminated melt fracture in 22 minutes. EC-12, in contrast, performed well regardless of the screw type. MB-12 contained fluoroelastomer particles with a weight average particle size of 3.0 microns, and the PEG in EC-12 acted as an interfacial agent to limit fluoroelastomer particle break-up during extrusion, so that fluoroelastomer particles with a weight average diameter greater than 2.0 microns were delivered to the die, independent of screw type. Although EC-12 represents an extrudable composition of the invention in Table IX, further increases in the dispersive mixing in the extruder could reduce the weight average fluoroelastomer particle size delivered to the die by EC-12 to a value below 2 microns. Both EC-K and EC-M illustrate this situation. EC-K had the identical LLDPE, fluoroelastomer, and PEG composition as EC-12, but with smaller fluoroelastomer particles (less than 2 micron weight average) delivered to the die. EC-K was made by blending a masterbatch known to contain small fluoroelastomer particles with a masterbatch containing PEG. In this way, the interfacial agent effect provided by PEG during the masterbatch compounding was eliminated. The results in Table IX show that when small fluoroelastomer particles are delivered to the die, PEG does not improve process aid performance (compare EC-K and EC-G). EC-K did not clear melt defects within one hour, nor did it show a large reduction in die pressure, because the weight average fluoroelastomer particle size delivered to the die was 1.4 microns.

The results in Table IX for EC-M show that the presence of polyethylene glycol interfacial agent in a masterbatch does not guarantee that an extrudable composition of the invention will be produced from the masterbatch. Although MB-12 and MB-J contained equal levels of fluoropolymer and polyethylene glycol, the fluoropolymer particles in MB-J had a smaller weight average size than MB-12 (2.2 microns vs. 3.0 microns). The difference in fluoropolymer particle size is believed to result from the increased compounding temperature used to produce masterbatch MB-J. Because the 2.2 micron weight average particle size of MB-J was close to the critical 2 micron threshold, even a slight degree of increased fluoropolymer dispersion in the extruder could cause the fluoropolymer weight average particle size to be reduced below 2.0 microns, and thereby impair the performance of the process aid. The data in Table IX for EC-M shows that the Maddock screw reduced the weight average fluoropolymer particle size in MB-J from 2.2 microns to 1.9 microns as delivered to the die in EC-M, and therefore EC-M is not as effective as the extrudable compositions of the invention in eliminating melt fracture or in decreasing die pressure.

A control extrusion test using only PEG (EC-L) confirmed that PEG did not eliminate melt defects, reduce die pressure, or produce particles which could be mistaken for fluoroelastomer.

What is claimed is:

1. An extrudable composition for passing through a die at an extrusion temperature, said composition comprising:
    A) a non-fluorinated melt processable polymer;
    B) 25 to 2000 parts per million by weight, based on total weight of the extrudable composition, of a fluoropolymer, said fluoropolymer having a weight average particle size greater than 2 microns and less than 10 microns, as measured at a point immediately preceding the die; and
    C) at least an effective amount of interfacial agent to achieve a fluoropolymer weight average particle size greater than 2 microns and less than 10 microns as measured at a point immediately preceding the die, but no more than a 5:1 weight ratio of interfacial agent to fluoropolymer, said interfacial agent being chemically distinct from both said non-fluorinated melt processable polymer and said fluoropolymer, and said interfacial agent having a melting point less than said extrusion temperature.

2. The composition of claim 1 wherein said interfacial agent is selected from the group consisting of i) silicone-polyether copolymers; ii) aliphatic polyesters; iii) aromatic polyesters; iv) polyether polyols; v) amine oxides; vi) carboxylic acids; vii) fatty acid esters; and viii) poly(oxyalkylene) polymers.

3. The composition of claim 2 wherein said interfacial agent is an aliphatic polyester.

4. The composition of claim 3 wherein said interfacial agent is a polycaprolactone having a number average molecular weight between 1000 and 32000.

5. The composition of claim 4 wherein said interfacial agent is a polycaprolactone having a number average molecular weight between 2000 and 10000.

6. The composition of claim 5 wherein said interfacial agent is a polycaprolactone having a number average molecular weight between 2000 and 4000.

7. The composition of claim 2 wherein said interfacial agent is a poly(oxyalkylene) polymer.

8. The composition of claim 7 wherein said poly(oxyalkylene) polymer is present at less than a 1:1 weight ratio of poly(oxyalkylene) polymer to fluoropolymer.

9. The composition of claim 1 wherein the fluoropolymer is a fluoroelastomer.

10. The composition of claim 9 wherein the fluoroelastomer has a ML(1+10) at 121° C. of up to 80.

11. The composition of claim 10 wherein the fluoroelastomer has a ML(1+10) at 121° C. of 65 to 80.

12. The composition of claim 1 wherein the fluoropolymer is a semi-crystalline fluoropolymer.

13. The composition of claim 12 wherein the semi-crystalline fluoropolymer has a melt index (ASTM D1238, 265° C., 5 kg weight) between 0.5 and 3.0 dg/min.

14. The composition of claim 1 wherein the fluoropolymer is a multimodal fluoropolymer.

15. The composition of claim 1 wherein the weight average particle size of the fluoropolymer is greater than 4 microns as measured at a point immediately preceding the die.

16. The composition of claim 15 wherein the weight average particle size of the fluoropolymer is greater than 6 microns as measured at a point immediately preceding the die.

17. The composition of claim 1 wherein the non-fluorinated melt processable polymer is selected from the group consisting of i) hydrocarbon resins, ii) polyamides, iii) chorinated polyethylene, iv) polyvinyl chloride, and v) polyesters.

18. The composition of claim 17 wherein the non-fluorinated melt processable polymer is a hydrocarbon resin selected from the group consisting of i) polyethylenes, ii) polypropylene, iii) polybutene-1, iv) poly(3-methylbutene), v) poly(methylpentene), and vi) copolymers of ethylene with an alpha-olefin.

19. A process aid masterbatch for use in an extrudable composition at an extrusion temperature, said process aid masterbatch comprising:

A) a non-fluorinated melt processable polymer;

B) 1 to 50 weight percent, based on total weight of the masterbatch, of fluoropolymer having a melting point less than said extrusion temperature, said fluoropolymer selected from the group consisting of i) fluoroelastomers having a Mooney viscosity, measured per ASTM D1646 at 121°C., large rotor, condition ML 1+10 minutes, of 60 to 80 and ii) semi-crystalline fluoropolymers having a melt index, measured per ASTM D1238, 265° C., 5 kg weight, between 0.5 and 3.0 dg/min; and C) at least an effective amount, to improve processability, of interfacial agent other than a poly(oxyalkylene) polymer, but no more than a 5:1 weight ratio of interfacial agent to fluoropolymer, said interfacial agent being chemically distinct from both said non-fluorinated melt processable polymer and said fluoropolymer, and said interfacial agent having a melting point less than said extrusion temperature.

20. The process aid masterbatch composition of claim 19 wherein said interfacial agent is selected from the group consisting of i) silicone-polyether copolymers; ii) aliphatic polyesters; iii) aromatic polyesters; iv) polyether polyols; v) amine oxides; vi) carboxylic acids; and vii) fatty acid esters.

21. The process aid masterbatch composition of claim 20 wherein said interfacial agent is an aliphatic polyester.

22. The process aid masterbatch composition of claim 21 wherein said interfacial agent is a polycaprolactone having a number average molecular weight between 1000 and 32000.

23. The process aid masterbatch composition of claim 22 wherein said interfacial agent is a polycaprolactone having a number average molecular weight between 2000 and 10000.

24. The process aid masterbatch composition of claim 23 wherein said interfacial agent is a polycaprolactone having a number average molecular weight between 2000 and 4000.

25. The composition of claim 19 wherein the fluoropolymer is a fluoroelastomer having a ML(1+10) at 121° C. of 60 to 80.

26. The composition of claim 19 wherein the fluoropolymer is a semi-crystalline fluoropolymer having a melt index (ASTM D1238, 265° C., 5 kg weight) between 0.5 and 3.0 dg/min.

27. The composition of claim 19 wherein the fluoropolymer is a multimodal fluoropolymer.

28. The composition of claim 19 wherein the non-fluorinated melt processable polymer is selected from the group consisting of i) hydrocarbon resins, ii) polyamides, iii) chorinated polyethylene, iv) polyvinyl chloride, and v) polyesters.

29. The composition of claim 28 wherein the non-fluorinated melt processable polymer is a hydrocarbon resin selected from the group consisting of i) polyethylenes, ii) polypropylene, iii) polybutene-1, iv) poly(3-methylbutene), v) poly(methylpentene), and vi) copolymers of ethylene with an alpha-olefin.

* * * * *

UNITED STATES PATENT AND TRADEMARK OFFICE
CERTIFICATE OF CORRECTION

PATENT NO.      : 6,642,310 B2
DATED           : November 4, 2003
INVENTOR(S)     : George Richard Chapman, Jr. and Steven Richard Oriani It is certified that error appears in the above-identified patent and that said Letters Patent is hereby corrected as shown below:

Column 5,
Line 51, the equation reading "$A = (\Sigma_i w_i X_i)$" is hereby deleted and -- $A = (\Sigma w_i X_i)$ -- is inserted in place thereof.

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,642,310 B2
DATED : November 4, 2003
INVENTOR(S) : Chapman George Richard, Jr. and Oriani Steven Richard It is certified that error appears in the above-identified patent and that said Letters Patent is hereby corrected as shown below:

Column 13,
Lines 45 and 46, change "MB-5, MB-6, MB-7, MB-8 and MB-C" to -- MB-5, MB-6, MB-C, MB-D and MB-E --.

Column 19,
Lines 55, 57, 60 and 61, for each occurrence change "MB-J" to -- MB-I --.

Column 20,
Line 16, for each occurrence change "MB-J" to -- MB-I --.

Signed and Sealed this

Eighth Day of November, 2005

JON W. DUDAS
*Director of the United States Patent and Trademark Office*